United States Patent [19]

Bryan, Jr.

[11] 4,217,715
[45] Aug. 19, 1980

[54] SIDE PROTECTOR FOR VEHICLES

[76] Inventor: William G. Bryan, Jr., 7335 Amhurst La., Clearwater, Fla. 33516

[21] Appl. No.: 10,248

[22] Filed: Feb. 8, 1979

[51] Int. Cl.² ............................................. G09F 21/04
[52] U.S. Cl. ..................................... 40/591; 293/118; 293/128
[58] Field of Search ................ 293/118, 119, 126–128, 293/50, 21–26; 296/21; 40/591, 618

[56] References Cited

U.S. PATENT DOCUMENTS

| | | | |
|---|---|---|---|
| 959,896 | 5/1910 | Staren | 40/618 |
| 1,779,661 | 10/1930 | Cleland | 293/118 X |
| 1,887,591 | 11/1932 | Fugita | 40/618 |
| 2,274,440 | 2/1942 | Tozier | 293/118 X |
| 2,512,527 | 6/1950 | Hoffman | 293/118 |
| 2,543,605 | 2/1951 | Smith | 40/618 X |
| 3,563,594 | 2/1971 | London | 293/128 |
| 3,718,357 | 2/1973 | Hertzell | 293/128 X |

*Primary Examiner*—John F. Pitrelli
*Attorney, Agent, or Firm*—B. P. Fishburne, Jr.

[57] ABSTRACT

A simplified sturdy and economical side guard or protector for automobiles is manually operated and requires no power assistance. The support frame of the protector is slidable in simple guide brackets secured to the bottom of the vehicle. When extended for use, the active portion of the protector is swung to an upright position where it can protect the most vulnerable areas of the automobile body against denting and scratching commonly caused by the swinging doors of other vehicles. The protector can also support letters or ornamental characters in a provided trackway. Rubber bumpers on the protector engage adjacent side portions of the vehicle.

9 Claims, 10 Drawing Figures

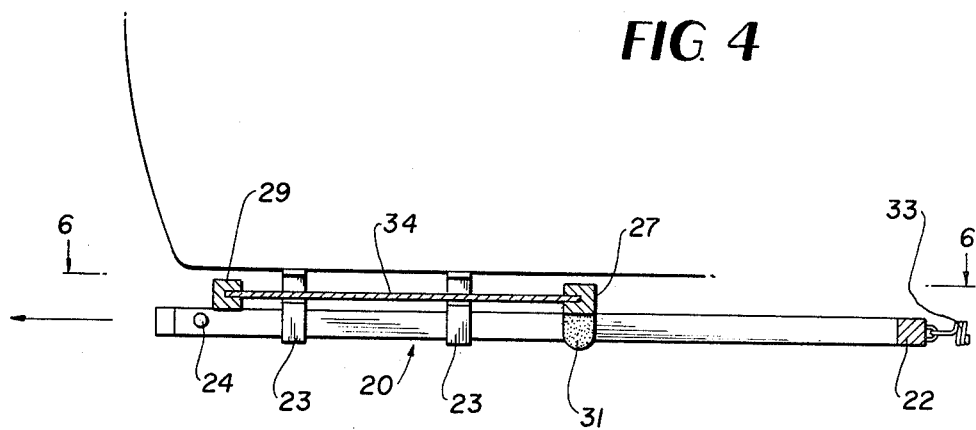
FIG. 4
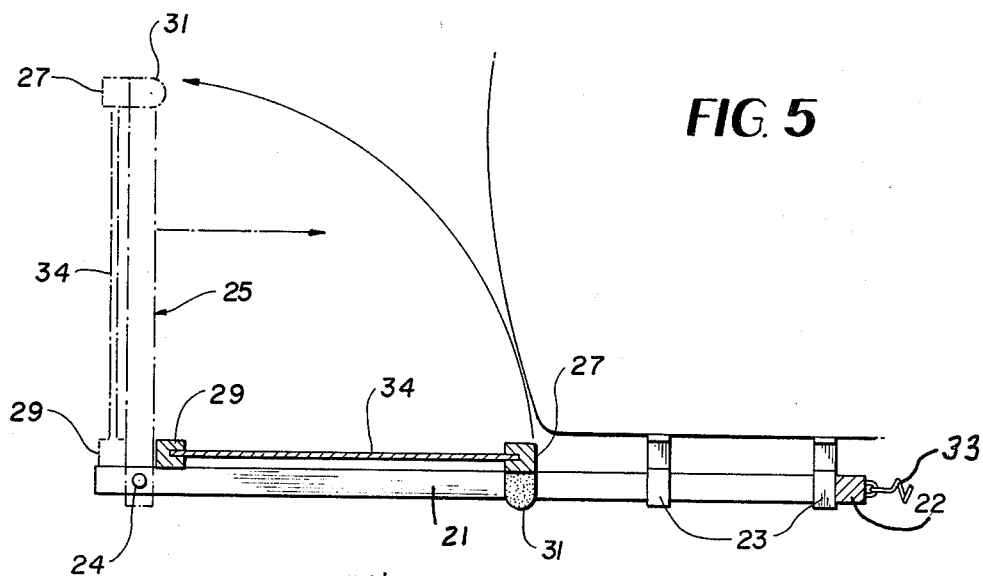
FIG. 5
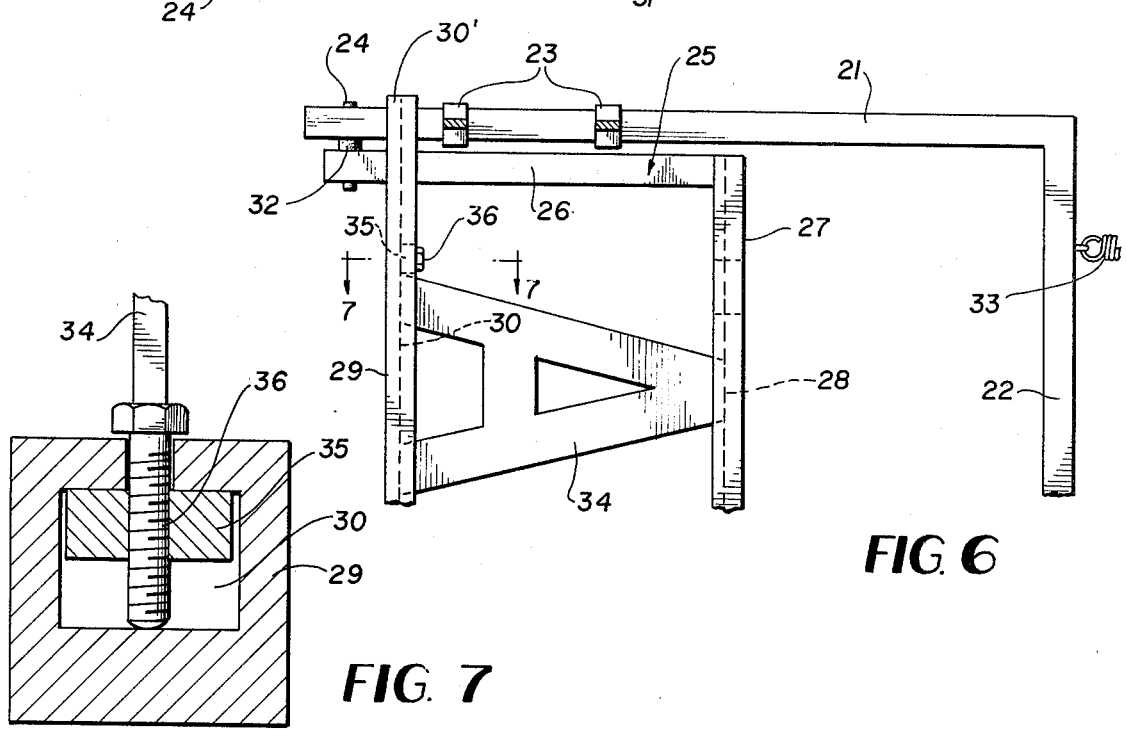
FIG. 6
FIG. 7

SIDE PROTECTOR FOR VEHICLES

BACKGROUND OF THE INVENTION

The great initial cost of present-day automobiles as well as high repair costs makes it very desirable to protect the vehicle to the greatest possible extent. One of the most frequently damaged areas on automobiles are the sides of the vehicle between the front and rear wheels, namely, the door areas. Manufacturers provide trim strips for these vulnerable areas with cushion inserts which offer some protection but not adequate protection, particularly from damaging blows caused by swinging doors of other vehicles in parking areas.

In recognition of this problem, the prior art contains some proposals to deal with it. Examples of the known prior art made of record herein under 37 C.F.R. 1.56 are the following U.S. Pat. Nos.:

2,274,440
3,563,594
3,718,357.

The devices disclosed in the above patents and other known devices have not been accepted by vehicle manufacturers or by the purchasing public because of excessive cost, bulkiness, poor appearance and because the devices generally require some form of power operator which again adds to the cost of manufacturing, installation and use. It is a well known fact that automobile manufacturers resist the adoption of any improvement feature which tends to add significantly to the cost of the vehicle.

In light of the above, it is the object of this invention to provide a greatly simplified, low cost, entirely manually operated side protector for vehicles which will be acceptable to both manufacturers and the purchasing public. The device of the invention is very convenient to use and easy to install on the vehicle without any modification of the vehicle structure. The device cannot damage the vehicle and will serve to entirely eliminate the troublesome denting and scratching of the sides of the vehicle body encountered by every driver of an automobile, particularly in parking lots and garages.

The invention also possesses ornamental virtue and is constructed to support changeable lettering or identifying characters or ornamentation.

Another feature of the invention resides in its compactness while in the stowed or non-use position or during shipment in a box or carton. The device is adaptable to practically all vehicle makes and models and can be supplied in several sizes.

Other features and advantages of the invention will become apparent during the course of the following detailed description.

BRIEF DESCRIPTION OF THE DRAWINGS

FIG. 4 is a view similar to FIG. 3 with the protector folded and in the stowed or non-use position.

FIG. 5 is another view similar to FIGS. 3 and 4 showing an intermediate position of the device between the positions of FIGS. 3 and 4.

FIG. 6 is a horizontal section taken on line 6—6 of FIG. 4.

FIG. 7 is an enlarged fragmentary vertical section taken on line 7—7 of FIG. 6.

DETAILED DESCRIPTION

Figure 1:
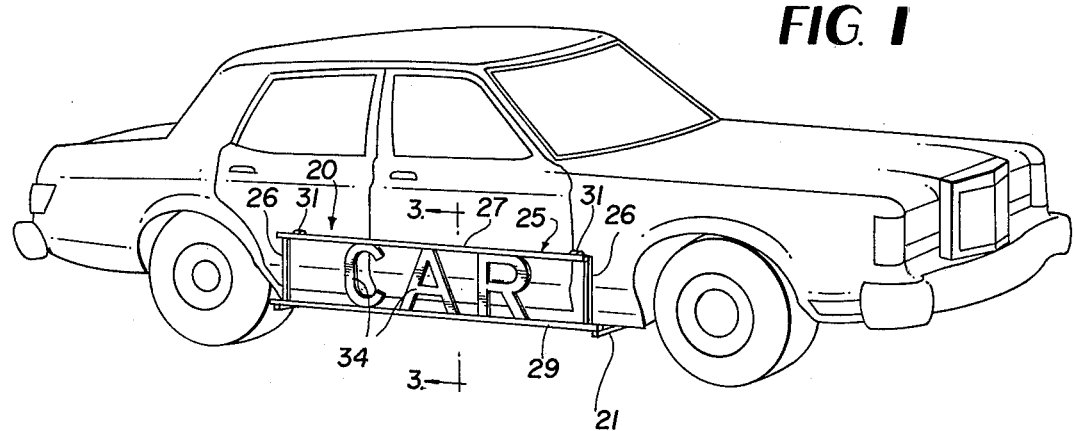
FIG. 1 is a perspective view of the invention shown in the active use position on a typical automobile.
Figure 2:
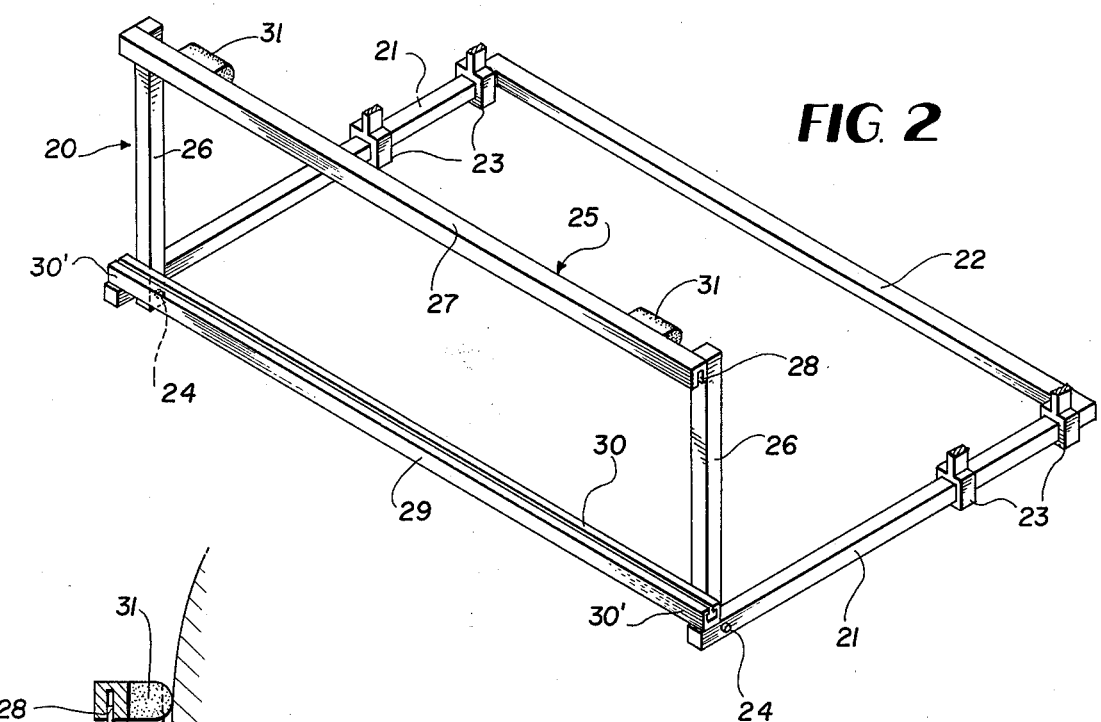
FIG. 2 is a perspective view of the invention in the position of FIG. 1 showing its support and guide brackets and having the identifying letters removed.

Referring to the drawings in detail wherein like numerals designate like parts, a side guard or protector for vehicles designated by the numeral 20 comprises a horizontal shiftable U-shaped support frame having parallel side bars 21 and a connecting inner end bar 22 which lies closely beneath the floor of the automobile body at all times. The length of the support frame between the bars 21 is such that the protector can span a major portion of the adjacent side of the vehicle body between the front and rear wheel wells. it should be noted that, for simplicity, the drawings show only one unit of the invention installed on one side of the automobile. In practice, a pair of units, one on each side of the vehicle, are provided for independent manual operation as desired.

The horizontal support frame composed of elements 21 and 22 is mounted slidably immediately below the floor of the vehicle by pairs of closed loop support brackets 23 suitably attached to the vehicle structure and receiving slidably therethrough the parallel bars 21 of the horizontal support frame.

Near their outward ends, the bars 21 carry pivot pins 24 on which a vertically swingable side guard or protector portion 25 of the device is pivotally supported. This protector portion 25 is rectangular and includes side comparatively short parallel arms 26 which may rise ten or twelve inches above the bars 21 when the device is in the active use position shown in FIG. 1. The arms 26 are rigidly interconnected at their tops by a longitudinal bar or rail 27 having a continuous groove 28 opening through its lower face, the rail 27 being located on the outer sides of the arms 26. Similarly, a lower rail 29 parallel to the rail 27 and somewhat longer than the same is fixed to the outer sides of the arms 26 somewhat above the pivot pins 24. The lower rail 29 has a preferably T-cross section channel or slot 30 formed therein with the restricted portion of the slot opening through the top of the rail 29 in opposing relationship to the slot 28.

A pair of yielding rubber pads or bumpers 31 is carried on the interior side of the upper rail 27, slightly inboard of the arms 26. These pads engage the protected sides of the vehicle body when the device is in the active use position shown in FIGS. 1 and 3.

When the guard portion 25 is in the upright active use position at right angles to the horizontal support frame, the end portions of the rail 29 will rest solidly on the outer end portions of bars 21, as shown in the drawings. Additionally, the rubber pads 31 will engage the adjacent side of the vehicle and tension springs 33 connected with the bar 22 of the horizontal support frame and suitably attached to vehicle structure, not shown, will bias the guard inwardly to the position of FIG. 3, assuring that the guard portion 25 will remain upright. This will allow the guard to be used on the passenger side of the vehicle even while the vehicle is in motion, if desired.

Rubber spacers 32, FIG. 6, in a somewhat compressed state, are arranged between the bars 21 and arms 26 on the pivot elements 24. These spacer elements prevent rattling of the structure and thus suppress noise. They also exert some desirable friction between the swinging guard portion 25 and its support frame including bars 21.

When the guard or protector is stowed horizontally closely beneath the floor of the vehicle, FIGS. 4 and 6, the guard portion 25 has been swung downwardly on the pivots 24 until end portions 30' of the lower rail 29 come to rest on the tops of horizontal bars 21. At such time, the arms 26 are disposed horizontally immediately inwardly of the bars 21 and at the same elevations as the bars 21, thus rendering the folded device highly compact beneath and close to the floor of the vehicle. The end portions 30' prevent the swinging guard or protector portion 25 from ever passing below the horizontal stowed position while the car is being driven and the device is being subjected to vibration and other inertial forces.

Figure 3:
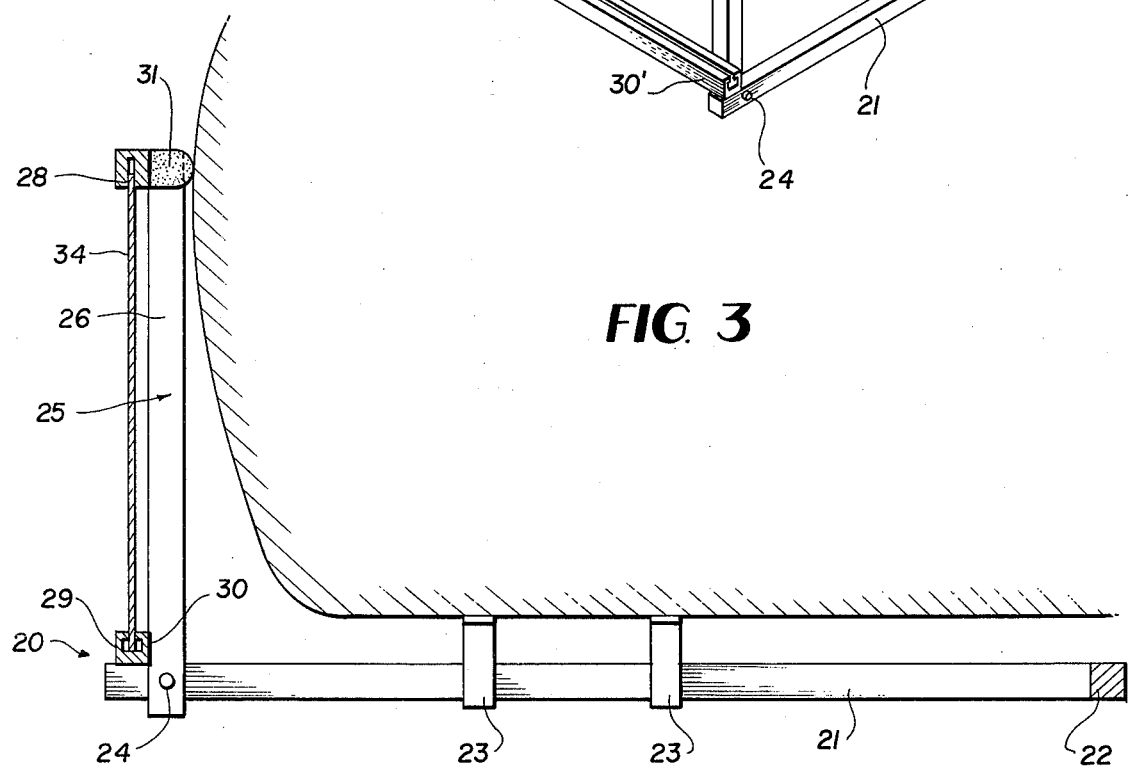
FIG. 3 is an enlarged vertical section taken on line 3—3 of FIG. 1.

When the guard is stowed in its folded non-use position beneath the vehicle floor, FIGS. 4 and 6, the previously-described springs 33 will retain the structure retracted beneath the floor. The springs 33 will yield to allow the device to be pulled forwardly to the intermediate position shown in FIG. 5, where the guard portion 25 can be swung upwardly to the active use position. Under influence of the springs, the guard can then move inwardly until the pads 31 contact the side of the vehicle, as shown in FIG. 3, in the use position. The entire operation is simple, convenient and fool-proof. As best shown in FIG. 5, the bar 22 by contact with the innermost brackets 23 limits outward movement of the device to the position of FIG. 5.

A further feature of the invention is the ability of the protector portion 25 to mount changeable letters 34, numerals or ornamental symbols in the grooves 28 and 30 of rails 27 and 29. Various combinations of the elements or letters 34 can be locked securely in position within the grooves 28 and 30 by threaded retainer blocks 35, FIG. 7, held in place by clamping screws 36. Other types of means for positioning the indicia elements 34 may be employed in some cases. When the elements 35 are released, the letters can be removed through the open ends of the grooves 28 and 30. If a particular user prefers, the protector can be employed without the indicia elements 34.

Figure 8:
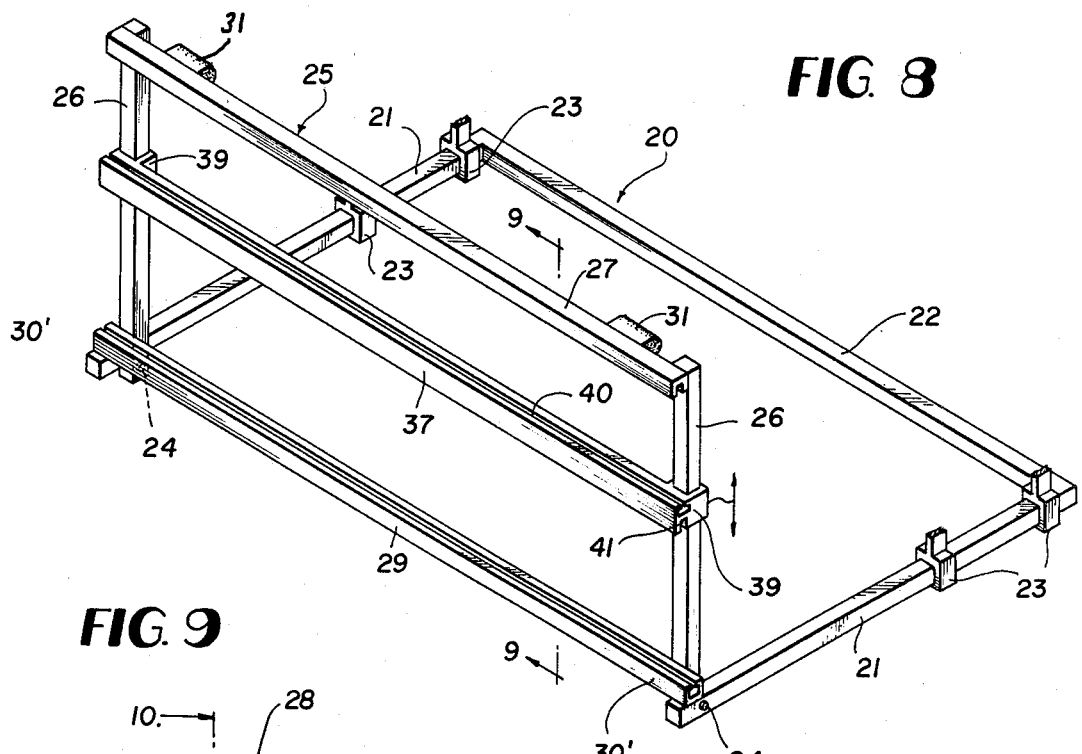
FIG. 8 is a perspective view of the protector according to a modification.
Figure 9:
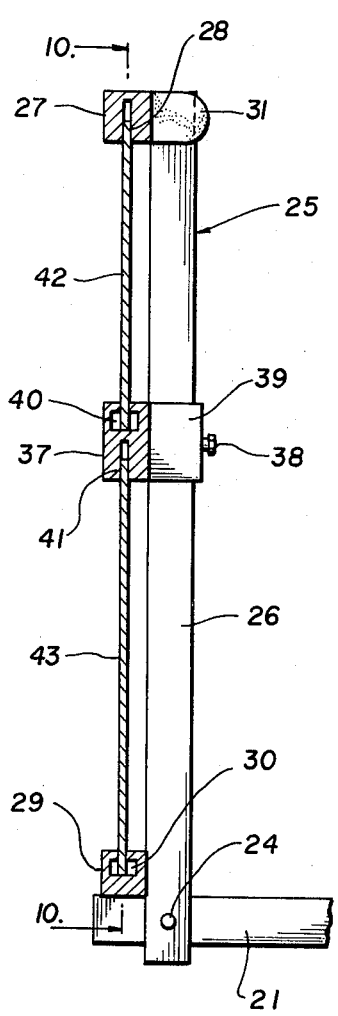
FIG. 9 is an enlarged fragmentary vertical section taken on line 9—9 of FIG. 8.
Figure 10:
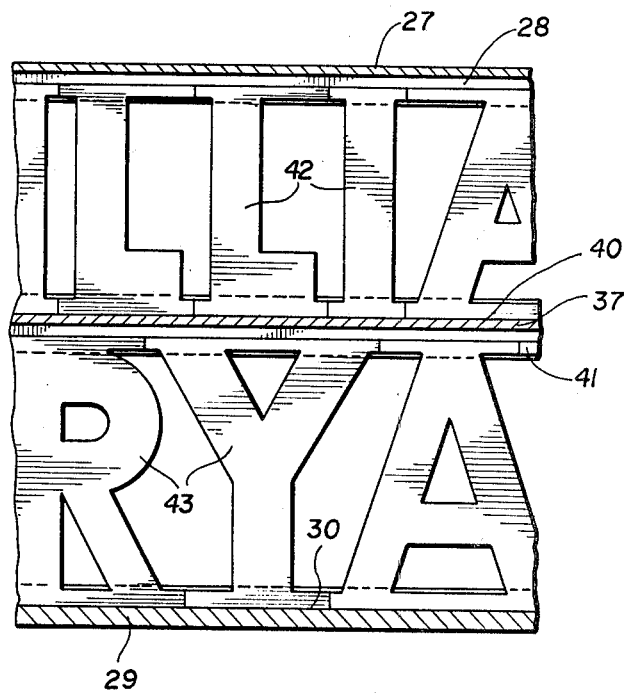
FIG. 10 is a fragmentary vertical section taken on line 10—10 of FIG. 9.

FIGS. 8 through 10 show a modification of the invention which is basically the same as the embodiment in FIGS. 1 through 7 except for one feature. This feature is the provision on the swingable guard portion 25 of an intermediate adjustable rail 37 parallel to the two rails 27 and 29 and being lockable in a selected adjusted position on the arms 26 by set screws 38 held in sleeve portions 39 of the rail 37 which slidably receive the arms 26.

The intermediate rail 37 has top and bottom longitudinal grooves 40 and 41 whereby the bottoms and tops, respectively, of indicia elements 42 and 43 in two separate rows of such elements may be supported and guided. The other extremities of the indicia elements are received as previously described in the grooves 28 and 30 of rails 27 and 29. In this manner, the device has greater flexibility in terms of displaying advertising indicia, personal names, call numbers and the like. In all other respects, the construction and mode of operation of the device in FIGS. 8 through 10 is unchanged from the described arrangement in FIGS. 1 through 7.

In either form, the protector is characterized by simplicity, convenience and economy to a degree which the known prior art does not possess.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A side protector for vehicles comprising a horizontal U-frame, the sides of said U-frame adapted for support slidingly in brackets attached beneath a vehicle floor with the U-frame held closely beneath the floor and being shiftable horizontally between a retracted position beneath the floor and an extended position beyond the floor, a vertically swingable vehicle side protector portion pivoted to the sides of said U-frame near and inwardly of the outer ends of the sides, resilient pad means on the interior side of said swingable protector portion and being engageable with the adjacent side of the vehicle when said protector portion is in an upright use position, said swingable protector portion including a lower bar adapted to rest on the sides of said U-frame in two positions on opposite sides of the pivots of said protector portion when the latter is upright and horizontal so that said protector portion cannot pass below horizontal or beyond the vertical in one direction of swing, and yielding spring means connected with the U-frame and with vehicle structure and biasing said U-frame toward said retracted position but allowing it to be pulled toward said extended position.

2. A side protector for vehicles as defined in claim 1, wherein said swingable protector portion includes a pair of parallel side arms pivoted to the sides of said U-frame and lying immediately inwardly of the sides of the U-frame, said lower bar of the swingable protector portion lying on the outer sides of said parallel arms near and above the lower ends of said arms and being at an elevation on said protector portion to rest solidly on top of the side of the U-frame outwardly of the pivots of said protector portion when the protector portion is upright, and end portions of said lower bar of the protector portion extending laterally beyond said parallel arms for sufficient distances to overlap the sides of said U-frame.

3. A side protector for vehicles as defined in claim 2, and at least a pair of support brackets for the U-frame beneath the floor of the vehicle and slidably receiving the sides of the U-frame and being engageable with a rear cross bar of the U-frame to positively limit outward extension of the side protector.

4. A side protector for vehicles as defined in claim 2, and said swingable vehicle said protector portion having an upper bar secured to the outer sides of said parallel arms in parallel relation to said lower bar, said upper and lower bars having opposing aligned grooves formed therein, and indicia characters engageable adjustably in said grooves.

5. A side protector for vehicles as defined in claim 4, and an intermediate bar on said swingable protector portion between and parallel to said upper and lower bars and adjustably secured to said parallel side arms and having grooves in its opposite faces opposing said grooves of said upper and lower bars, whereby indicia characters may be placed between the upper and intermediate bars and the lower and intermediate bars of the protector portion.

6. A side protector for vehicles as defined in claim 5, and sleeve elements carried by opposite end portions of said intermediate bar and slidably engaging said parallel arms, and locking set screws on the sleeve elements for releasably locking the intermediate bar in selected adjusted positions on the swingable protector portion.

7. A side protector for vehicles as defined in claim 4, and screw-threaded positioning and locking means for said indicia characters engaging slidably within at least one of said grooves.

8. A side protector for vehicles as defined in claim 1, and said vertically swingable vehicle side protector portion comprising a rectangular frame of lesser width than said U-frame in the direction defined by the sides of the U-frame and including parallel side arms adapted to nest inside of the U-frame when said side protector is in its folded retracted position beneath said floor.

9. A side protector for vehicles as defined in claim 8, and spacers of rubber-like material on the pivots of said swingable side protector portion and between the sides of said U-frame and the side arm of said portion to prevent rattling of said side protector on a vehicle.

* * * * *